United States Patent Office 3,345,321
Patented Oct. 3, 1967

3,345,321
PRETREATMENT OF POLYMER SOLUTION
WITH RUBBER LATICES
Friedrich Henry Herman Geurtsen, White Plains, N.Y., and James Cosmo Barone, Stamford, and Joseph Francis Terenzi, South Norwalk, Conn., assignors to American Cyanamid Company, Stamford, Conn., a corporation of Maine
No Drawing. Filed July 23, 1963, Ser. No. 296,945
7 Claims. (Cl. 260—34.2)

This invention relates to an improved method for the production of thermoplastic resinous compositions prepared from resinous polymers and elastic, rubber polymers. More particularly, this invention relates to an improved method for continuously blending resinous polymers and elastic rubbery polymers which comprises pretreating the resinous polymers and the rubbery polymers to form a mixture thereof and then devolatilizing and extruding the resultant mixture.

High impact molding compositions produced from hard resinous polymers and rubbery polymers are well known in the art. Various methods are known for the incorporation of the rubbery polymers into the hard resinous polymers. Among the known methods is that of mechanically working or masticating a mixture of the thermoplastic resin and elastomer on heated compounding rolls, the ingredients of the mixture thereby forming a homogeneous mass that is suitable for utilization as a molding compound. Another method which has been employed is the blending of the solid resin and the elastomer under heat and pressure in compounding mills such as Banbury mixers to blend the components of the mixture. Another procedure is to dissolve the elastomer in monomer of the type which forms the hard resin, polymerize, and coagulate the emulsion latices of the hard and rubbery polymers, thereby forming the resin-rubber composition. These prior methods, however, generally employ batch procedures which are time consuming and, by the time the mixture is sufficiently milled to effect homogeneous blending, the physical properties may be adversely affected. In other words, using methods which employ mechanical working or milling of the resinous composition, often results in a substantial molecular breakdown and weakening of the polymeric components by the time that the material is sufficiently worked to make the blend homogeneous.

Another method known for producing these high impact molding compositions, without subjecting the components thereof to the extremely vigorous masticating procedures of the prior art thereby preventing the molecular breakdown and degradation of the polymeric components as well and producing molding compositions having properties superior to those produced by previous methods comprises mixing a solution of a hard resinous polymer and a liquid dispersion of a rubbery polymer and devolatilizing and extruding the mixture at a temperature between 110° C. and 245° C. and a pressure of less than 200 mm. Hg. in less than five minutes.

We have now discovered an improved process which enables the production of molding compositions from hard resinous polymers and rubbery polymers, which compositions have properties superior to those heretofore produced and which may be produced more easily and with less technical difficulties.

It is therefore an object of our invention to provide an improved continuous method for preparing thermoplastic high impact resinous compositions prepared from resinous polymers and rubbery elastomers.

It is another object of this invention to provide an improved continuous method for making resinous molding compositions from resinous polymers and elastic, rubbery polymers, which procedure provides excellent homogeneity of the product, enables control of the uniformity of the product and results in products having superior properties.

These and other objects of our invention will become more apparent upon reading the more detailed description set forth hereinbelow.

To facilitate the description of the invention, the resinous polymer components of the blended compositions, will be referred to as component (A) and the rubbery, elastomeric compounds of the blends will be referred to as component (B).

According to the novel process of the invention, the resinous polymer component (A) is employed in solution. The elastic rubbery component (B) is employed in a dispersed form, either in solution or as a colloidal emulsion, such as an SBR latex. It will be apparent therefore that the term "rubbery dispersion" includes a solution thereof, i.e., a dispersion of rubber in a solvent, as well as rubber in latex form. The solvent employed for either of the components, i.e., the resin or the rubbery elastomer may be any of the known solvents which are suitable therefor, such as toluene, xylene, etc. but it is preferred that the rubber be used in latex form. For example, if the resinous molding compositions are a blend of a terpolymer of methyl methacrylate/styrene/acrylonitrile and a grafted polybutadiene rubber, the solvent employed in making the solution of the terpolymer to be blended is preferably xylene or toluene and the polybutadiene is in latex form. In an alternative manner, an SNR elastomer (styrenebutadiene type synthetic rubber) or a modified elastomer may be employed in latex form, the proportion of rubbery solid in the dispersion comprising between about 30% and 60% of the emulsion.

In preparing the solution of resinous polymer (A) to be used in practicing this invention, it is preferred that the solution contain not more than about 80% polymer in solution and preferably at least 45% polymer. Amounts of polymer greater than 80% tend to result in difficulties in handling the material thereby minimizing the economical advantage afforded by our novel technique by correspondingly prolonging the processing time required to effect the removal of the unreacted monomer. It is apparent that the step of dissolving the preformed polymer to form the solution of the hard resin component (A) may be avoided and such solution may be derived directly from the polymerization of the monomers such as by the method described in pending application, Ser. No. 195,576, filed May 17, 1962. In this method, polymerization of the monomers is accomplished via a two-stage process wherein a tower reactor is utilized to produce a xylene solution of a highly converted polymeric composition. According to the present invention, it is thus preferred that not more than about 80% polymer be present in the solution of the resinous component.

The present invention, however, may utilize a previously prepared solid polymer which is dissolved in a suitable solvent to provide component solution (A).

According to the present invention, the resinous component (A) and the rubbery component (B) are pretreated to form a mixture thereof prior to devolatilization and extrusion. The pretreatment comprises contacting component (A) and component (B) at a temperature ranging from about 50° C. to about 110° C., preferably about 70° C. to about 100° C. at atmospheric pressure. Temperatures below 50° C. tend to create difficulty in handling the components because the viscosity of component (A) is such that the working thereof is practically impossible at lower temperatures. The maximum temperature is governed by the boiling point of the solvent employed in forming the solution of the polymer and the rubber component. If a rubber latex is employed the boiling point of water (100° C.) governs the maximum temperature, however, it is within the scope of the present invention to use pressures above atmospheric, i.e., up to about 5 p.s.i., preferably not over 50 p.s.i., and thereby enable the use of slightly higher temperatures. While at these pressures and temperatures, the combined components (A) and (B) are held for a period of from about 1 minute to about 30 minutes, preferably about 2 to 10 minutes, while they are continuously subjected to continued subdivision and recombination action effected by shearing, thereby producing a uniform composition having both a microscopic and a macroscopic dispersion of the components.

Any type of apparatus which functions so as to perform such a pretreatment on the resinous polymer solution and the rubbery latex dispersion or solution may be used in the process of the present invention. One type of apparatus which may be used is of a commercially available design and comprises a chamber which contains a single, horizontal shaft with an interrupted screw thereon, said screw possessing flights constructed so as to move the rubber latex and resinous solution being treated in a forward direction. Stationary anvils, attached to the housing, may be inserted into the interruptions of the screw. The interaction of the rotating horizontal screw and the stationary anvils gives a continuous kneading and mixing action so as to cause a continual subdivision and recombination of the rubber latex and the resin polymer solution being pretreated. Various breaker plates and die plates may be positioned in the apparatus to provide back pressure to increase the holdup time and shearing action which occurs inside the chamber. Generally, three plates may be employed, two of which are of the breaker variety and one of which is a die plate. The breaker plates are positioned internally and the die plate is generally positioned at the discharge end of the chamber. The plates contain holes ranging in size of from about ⅛ inch to about ⅝ inch. Each plate may contain the same size holes or each plate may have different size holes therein. Although the above discussion indicates that three die plates may be used, it is possible to employ as many as five and as few as one plate, depending upon the holdup time desired.

Although apparatus of the type described above is preferred, it should be understood that any other type of apparatus which will cause the continuous subdivision and recombination of the rubber latex and the resinous polymer solution may be used provided that such apparatus is conducive to the use thereof in a continuous process rather than a batch process.

It is this pretreatment which we have found beneficial to the production of molding compositions having improved properties in regard to texture, homogeneity, impact strength and subsequent moldability. After this pretreatment of the resin component (A) and the rubber component (B) the resultant product is then processed as further enumerated below.

After the pretreatment to form a dispersion, as mentioned above, said dispersion is continuously fed in conjunction with any other desired additives such as dyes, pigments, stabilizers, fillers, etc., to a devolatilizer-extruder where it is further mixed and compounded, and then devolatilized and extruded, all in a period of less than 5 minutes. In the devolatilizer-extruder, the pretreated mixture is worked in a chamber under heat and vacuum so that the new surfaces of the pretreated polymer mixture are continuously and rapidly exposed to vacuum to remove the monomeric solvent (and water where rubber in latex form is employed) before extruding the product. The term devolatilization as herein employed refers to the step in which the nonpolymeric material is removed from the pretreated blend of resin solution and rubbery dispersion. The apparatus which may be used to simultaneously devolatilize and extrude the material is of a commercially available design and comprises a chamber with one or more screws having a close tolerance with the chamber wall for compounding the material in its passage therethrough, and at least one vacuum chamber for removing the volatile components of the feed. The action of working the material under the close tolerance of the screws generates substantial heat which volatilizes the nonpolymer of the blend.

The devolatilizer-extruder may contain one or more interconnected sections, at least one being under vacuum. A preferred treatment wherein the material is worked for a total time of from 1 to 5 minutes, employs two vacuum sections. In addition to the vacuum sections, the devolatilizer-extruder may contain a section following the vacuum sections which is atmospheric, i.e., not under vacuum, wherein various volatile or non-volatile modifiers, plasticizers or colorants etc., may be incorporated into the composition and extruded therewith if not previously added.

The vacuum sections of the devolatilizer-extruder are heated from temperatures of about 110° C. to about 245° C. and maintained under vacuum at an absolute pressure of from about 5 to 200 mm. mercury. Preferably, the temperature of the sectionally heated devolatilizer-extruder is maintained at from about 160° C. to about 210° C. and the vacuum is preferably maintained at from about 5 to about 200 mm. mercury absolute pressure. As the pretreated components are introduced into the devolatilizer-extruder, the increased temperature causes volatilization of the nonpolymer from the two polymer components. At the same time, because the extruder is maintained at subatmospheric pressures, the volatile material is withdrawn or devolatilized from the polymer-containing material. In this operation the purity of the polymer is carried to greater than 98%. It should be noted that the devolatilization and extrusion does not involve polymerization of the two components, but rather concerns the removal of the volatile ingredients from the pretreated mixture employed in making the molding composition. In fact, the rapid passage of the pretreated blend through the devolatilizer-extruder in a period of less than 5 minutes is not conducive to any significant additional polymerization of polymerizable content present therein because of the rapidity of the step.

The treatment in the devolatilizer-extruder is highly advantageous in its rapidity in view of the fact that the removal of the solvent or suspending medium from the pretreated components is dependent upon the rate of diffusion from the polymeric material and this removal is ordinarily a very slow process, particularly with viscous polymer molecules having relatively large cross-sections.

It is thus seen that a continuous process is achieved wherein a resinous polymer in solution and a rubbery polymer, in solution or as a latex, is pretreated to form a homogeneous mixture and the mixture is then devolatilized and extruded under the mechanical pressure of the screws of the devolatilizer-extruder and under vacuum. In the devolatilizer-extruder, the non-polymer contents of the pretreated mixture are thoroughly removed as the mixture is worked by the heat generating mechanical action of the devolatilizer screw under vacuum. By this technique, the rate of diffusion is so improved that substantially 100% of the undesirable nonpolymer material is removed from the polymer thereby producing an excellent molding composition practically free of contaminants.

The total contact time of the pretreated material introduced into the devolatilizer-extruder to produce a material of greater than 98%, and generally better than 99%, polymer is less than about 5 minutes and ordinarily from about 0.5 to about 3 minutes. The relatively brief time is not only of itself advantageous, particularly in view of the fact that it is conducted continuously, but the rapidity of the processing time has also been found to greatly minimize the loss of the desirable properties from the blend, a disadvantage which commonly occurs when milling the mixtures by other methods.

The amount of the elastic rubbery component employed in our invention may vary widely, however, a preferred composition is obtained when from a minor proportion, i.e., about 5% to about 45%, by weight, based on the total weight of the composition, of the rubbery elastomer (B) either in solution as a latex is employed, and correspondingly from about 95% to about 55%, by weight, of the resinous component (A) may be used.

The rubbery elastomers (B) employed in our invention may be any well known rubbery compound either natural or synthetic, many of wihch are available commercially both in solid form or as latices. In general, these elastomers comprise polymers and copolymers derived from diolefin compounds, such as butadiene-1,3; isoprene; 2,3-dimethylbutadiene-1,3; 1,4 - dimethylbutadiene - 1,3; piperylene; heptadiene-1,3; 2-methylpentadiene-1,5; 2-methyl-3-butyl butadiene-1,2; 2,3-diethylbutadiene; and the like. The rubbery elastomeric compound (B) may consist entirely of a natural rubber or a synthetic rubbery diolefin, i.e., a homopolymer, although the diolefin rubbery polymer preferably contains a minor proportion, i.e., from about 5% to about 40% of an olefinic modifying compound, such as those of the general formula above, e.g., stryene, vinyl toluene, etc. or an acrylate or pyridine, for example. The rubbery elastomers thus include such compounds as styrene-butadiene and butadiene-acrylonitrile rubbers, neoprene rubber, butyl rubbers, silicone rubber, polyacrylate rubber, pyridine-butadiene rubbers and chlorosulfonated polyethylene, for example. The styrene-butadiene synthetic rubbers generally contain about 75% butadiene and about 25% styrene and the nitrile-butadiene rubbers about 15% to about 35% acrylonitrile, the remainder being butadiene. The composition of these rubbers, styrene-butadiene and acrylonitrile-butadiene, now referred to as SBR and NBR rubbers, respectively, (see ASTM designation; D1418–56T, June 1956), however, is not restricted to the above proportions. A highly desirable composition is obtained when the rubbery elastomer component (B) employed, either in solution or as a latex, is SBR type rubber, preferably containing styrene or methylstyrene in amounts of from about 40% to about 95% by weight of butadiene with from about 60% to about 50% of styrene or methylstyrene.

The rubbery component utilized in the production of the high impact molding compositions may also preferably consist of grafted rubbers wherein the rubber backbone, i.e., polybutadiene or any of the rubbers listed above are grafted (by any known procedure) with a graftable monomer. When such grafted rubbers are used, the backbone may be grafted with the monomer or monomers from which the resinous polymer (Component A) with which it is to be blended, is produced, or any graftable monomeric compound, i.e., any of those set forth hereinbelow.

The resinous thermoplastic polymer (A) useful in our novel process is prepared by homopolymerizing or copolymerizing a polymerizable monomer containing ethylenic unsaturation.

Methacrylic acid esters may be employed as the main constituents in the hard resinous polymeric components of the compositions produced by the process of the present invention and those having the general formula (I) 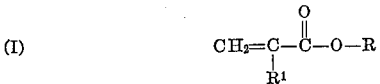

wherein R represents an alkyl radical containing from 1 to 6 carbon atoms, inclusive, and $R^1$ represents hydrogen, a methyl radical or a methyl halide. Compounds which are represented by the above formula and consequently may be used in the present invention include methyl methacrylate, ethyl methacrylate, propyl methacrylate, isopropyl methacrylate, n-butyl methacrylate, isobutyl methacrylate, amyl methacrylate, hexyl methacrylate, their corresponding acrylates and the like.

Other monomers which may be used in the instant invention, alone or in admixture with the acrylic acid esters and methacrylic acid esters disclosed above, or other vinyl-type monomers, are the alkenyl aromatic compounds having the formula

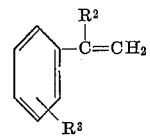

wherein $R^2$ is a hydrogen atom, a halogen substituent, or an alkyl radical of 1 to 8 carbon atoms, inclusive, and $R^3$ is an alkyl radical of 1 to 8 carbon atoms, inclusive, an alkoxy radical of 1 to 8 carbon atoms, inclusive, a halogen radical, hydrogen or a cyano radical.

Compounds which are represented by Formula II include styrene, methylstyrene, ethylstyrene, propylstryene, n-butylstyrene, t-butylstyrene, amylstyrene, hexylstyrene, octylstyrene, chlorostyrene, bromostyrene, iodostyrene, fluorostyrene, methoxystyrene, ethoxystyrene, propoxystyrene, octoxystyrene, cyanostyrene, α-chlorostyrene, α-bromostyrene, α-iodostyrene, α-fluorostyrene, α-methylstyrene, α-ethylstyrene, α-octylstyrene and the like.

Other monomers which can be used to form polymeric component (A) used in our novel process and which can be used after having been polymerized either singly or in a plurality (two, three, four or any desired number), the latter often being desirable in order to improve the compatability and copolymerization characteristics of the mixture of monomers and to obtain copolymers having the particular properties desired for the particular service application when blended with the rubbery component (B), are such monomers as the unsaturated alcohol esters, more particularly the allyl, methallyl, crotyl, 1-chloroallyl, 2-chloroallyl, cinnamy, vinyl, methvinyl, 1-phenylallyl, butenyl, etc., esters of saturated and unsaturated aliphatic and aromatic monobasic and polybasic acids such, for instance, as acetic, propionic, butyric, valeric, caproic, crotonic, oxalic, malonic, succinic, glutaric, adipic, pimelic, suberic, azelaic, sebacic, maleic, fumaric citraconic, mesaconic, itaconic, acetylene dicarboxylic, aconitic, benzoic, phenylacetic, phthalic, terephthalic, benzoylphthalic, etc., acids; the saturated monohydric alcohol esters, e.g., the methyl, ethyl, propyl, isopropyl, butyl sec.-butyl amyl, etc., esters of ethylenically unsaturated aliphatic monobasic and polybasic acids, vinyl naphthalene, vinylcyclohexane, vinyl furane, vinyl pyridine, vinyl dibenzofuran, divinyl benzene, trivinyl benzene, allyl benzene, diallyl benzene, N-vinyl carbazole, unsaturated ethers, e.g., ethyl vinyl ether, diallyl ether, ethyl methallyl ether, etc.; unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.; ethylene; unsaturated polyhydric alcohol (e.g., butenediol, etc.) esters of saturated and unsaturated, aliphatic and aromatic, monobasic and polybasic acids.

Other examples of monomers that can be polymerized to form component (A) useful in our novel process are the vinyl halides, more particularly vinyl fluoride, vinyl chloride, vinyl bromide and vinyl iodide, and the various vinylidene compounds, including the vinylidene halides, e.g., vinylidene chloride, vinylidene bromide, vinylidene fluoride and vinylidene iodide, other comonomers being added if needed in order to improve the compatability and copolymerization characteristics of the mixed monomers.

Among other monomers which may be used in carrying our invention into effect are, for example, compounds such as acrylonitrile, and other compounds, e.g., the various substituted acrylonitriles (e.g., methacrylonitrile, ethacrylonitrile, phenylacrylonitrile, etc.), the various N-substituted acrylamides and alkacrylamides, for instance, N-dialkyl acrylamides and methacrylamides, e.g., N- dimethyl, -diethyl, -dipropyl, -dibutyl, etc., acrylamides and methacrylamides and the like. Other monomers copolymerizable with the instant novel monomers are given, for instance, in United States Patent No. 2,601,572, dated June 24, 1952, where examples are given both by classes and species.

The following examples are set forth as illustrative of the continuous process of our invention for making a resinous composition by pretreating the resin and rubbery components to form a homogeneous mixture and then simultaneously extruding and devolatilizing the resultant mixture. The results obtained in the examples, as well as comparative runs with known mixing techniques are set forth below. The examples should not be construed as limitations on the present invention except as set forth in the appended claims. All parts and percentages are by weight unless otherwise specified.

*Example 1*

A resin solution of terpolymer comprising 70% methyl methacrylate, 15% styrene and 15% acrylonitrile, dissolved in 30% xylene, is continuously added to a sufficient amount of a grafted rubber latex of the GRS 2004 type in a suitable vessel so as to contain 20% unsaturation. The grafted latex contains monomers of 94% methyl methacrylate, 3% styrene, and 3% acrylonitrile resulting in a latex with a 2.0/1 ratio of polybutadiene to grafted monomers. The resin solution is fed into said vessel at 135° C. and the latex is fed at 20° C. The vessel contains 2 breaker plates and a die plate having holes of ½ inch, ⅜ inch and ⅜ inch, respectively. The mixture is continuously pretreated at a temperature of approximately 70° C. in said vessel for approximately 2.5 minutes. The pretreated mixture is then fed to a twin screw devolatilizer-extruder maintained at the feed end at a temperature of 80° C., at the extrusion end at a temperature of about 200° C. and at the central portion at a temperature of about 170° C. The resultant devolatilized molding composition is continuously extruded from the devolatilizer, after a retention time of about 3 minutes, to yield a composition having an impact strength of 3.8 f.p.p.i. Izod.

*Example 2*

Following the procedure of Example 1, except that the grafted latex is first thermally coagulated by heating to 95–100° C. and the polymer and latex are pretreated in a sigma mixer, a molding composition is recovered having an impact strength of only 2.5 f.p.p.i. Izod. Additional milling, instead of devolatilizing and extruding, of similar samples prepared in the sigma mixer on a two-roll mill fail to increase the product impact strength. Photomicrographs of the products of Examples 1 and 2 show a much higher dispersion in the product of Example 1.

*Example 3*

A resin solution of a terpolymer comprising 60% methyl methacrylate, 35% styrene and 5% acrylonitrile, dissolved in 30% xylene is continuously added to a sufficient amount of a grafted rubber latex of the GRS 2003 type (butadiene/styrene-75/25) in a suitable vessel so as to contain 20% unsaturation. The grafted latex contains monomers of 94% methyl methacrylate, 3% styrene and 3% acrylonitrile resulting in a latex with a 2.0/1 ratio of butadiene-styrene to grafted monomers. Pretreatment of this mixture is continuously effected at a temperature of approximately 70° C. in said vessel which contains 2 breaker plates and one die plate having holes therein of ⅜ inch, ⅜ inch and ¼ inch, respectively. The holdup time in said vessel is approximately 12 minutes. Upon subjection of this pretreated mixture to a twin screw devolatilizer-extruder under conditions set forth in Example 1, a molding composition having an impact strength of 2.2 f.p.p.i. Izod is recovered.

*Example 4*

A resin solution of a terpolymer comprising 75% methyl methacrylate, 20% styrene, and 5% acrylonitrile, dissolved in 30% xylene is continuously added to a sufficient amount of a grafted rubber latex of the GRS 2004 type in a suitable reaction vessel so as to contain 20% unsaturation. The grafted latex contains monomers of 71% methyl methacrylate, 19% styrene and 10% acrylonitrile resulting in a latex with a 2.0/1 ratio of polybutadiene to grafted monomers. The blend is then treated according to Example 1 in a vessel for approximately three minutes. After devolatilization the molding composition recovered has an impact strength of 2.6 f.p.p.i. Izod.

*Example 5*

A resin solution of terpolymer comprising 71% methyl methacrylate, 19% styrene and 10% acrylonitrile, dissolved in 30% xylene is continuously added to a rubber latex (Example 1) to yield a mixture containing 6% unsaturation. The resultant mixture is then pretreated according to the procedure set forth in Example 1 at 90° C. with a vessel having holes of ¼ inch, ¼ inch and ¼ inch on the breaker plates and die plate, respectively for 6 minutes. Upon devolatilization, a molding composition having an impact strength of 0.5 f.p.p.i. Izod is recovered.

We claim:
1. In a continuous method for the production of a high impact molding composition of (A) a non-rubbery resinous thermoplastic polymer and (B) a different polymer selected from the group consisting of natural rubber and organic synthetic rubbers artificially produced by devolatilizing and extruding a solution of (A) in a volatile solvent, said solution having not more than 80%, by weight, of polymer (A), and a liquid dispersion of (B) at a temperature of between about 110° C. to about 245° C. and at an absolute pressure of less than 200 millimeters of mercury in a period of less than about 5 minutes, the improvement which comprises pretreating a mixture of polymers (A) and (B), previous to said devolatilization and extrusion, at a temperature of between about 50° C. and about 110° C. and a pressure of less than 50 p.s.i. by holding said mixture at said temperature and pressure for a period of from about 1 minute to 30 minutes, while continuously subjecting said mixture to a continual subdivision and recombination effected by shearing so as to produce a uniform composition having both a microscopic and a macroscopic dispersion of said (A) and (B).

2. Process according to claim 1 wherein (A) is a polymer of methyl methacrylate.

3. Process according to claim 1 wherein (A) is a terpolymer of methyl methacrylate, styrene and acrylonitrile.

4. Process according to claim 1 wherein (B) is a grafted rubber.

5. Process according to claim 1 wherein (B) is a grafted rubber which is grafted with the same monomers of which (A) is composed.

6. Process according to claim 1 wherein (B) is polybutadiene grafted with methyl methacrylate, styrene and acrylonitrile.

7. Process according to claim 1 wherein the temperature of said improvement ranges between about 70° C. and 100° C., the pressure is up to about 5 p.s.i. and the holding time ranges from about 2 to 10 minutes.

References Cited

UNITED STATES PATENTS

| 2,027,961 | 1/1936 | Currie et al. | 260—34.2 |
| 2,101,107 | 12/1937 | Strain | 260—34.2 |

OTHER REFERENCES

Winding et al.: "Polymeric Materials," McGraw-Hill Book Company, Inc., New York, N.Y. (1961), pp. 110–112.

JULIUS FROME, *Primary Examiner.*

MORRIS LIEBMAN, *Examiner.*

F. M. SIKORA, *Assistant Examiner.*